Feb. 15, 1944.

H. P. HOLT 2,341,779

SECTOR ARM FOR WEIGHING SCALES

Filed June 1, 1942

*INVENTOR.*
HAROLD P. HOLT
BY
ATTORNEY.

Patented Feb. 15, 1944

2,341,779

UNITED STATES PATENT OFFICE 2,341,779

SECTOR ARM FOR WEIGHING SCALES

Harold P. Holt, St. Johnsbury, Vt., assignor to Fairbanks, Morse & Co., Chicago, Ill., a corporation of Illinois Application June 1, 1942, Serial No. 445,293

1 Claim. (Cl. 265—62)

This invention relates to weighing scales generally, and particularly to certain improvements in the construction of tape-driven sector arms for pendulum type scales.

The object of the present invention is to provide a pendulum sector arm formed principally of cast iron or other low cost, readily obtainable metal, having an arcuate tape-engaging part formed in an improved manner so as to be easily and accurately machined, and which will not be materially affected by dust or other foreign matter that tends to impair the accuracy of the scale.

Other objects and advantages will be apparent from the following description in which reference is had to the accompanying drawing illustrating a preferred embodiment of my invention and wherein similar reference numerals designate similar parts throughout the several views.

In the drawing, Fig. 1 is a front elevation of a weighing scale pendulum arm and its mounting, together with the principal parts of the scale indicating mechanism to which it is connected;

Figure 1:
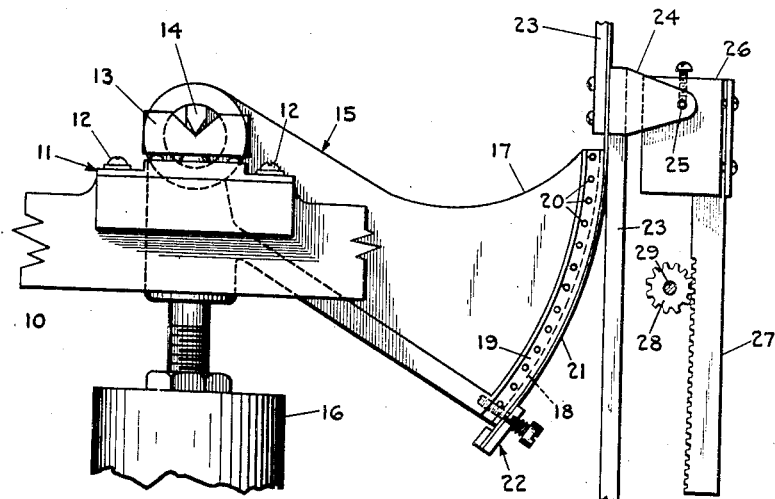
Figure 2:
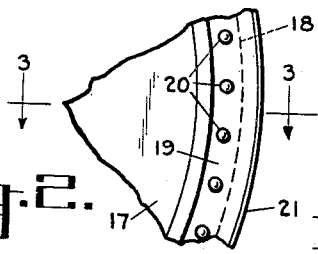
Fig. 2 is a front view of a section of the pendulum arm cam sector showing the construction of the cam surface.
Figure 3:
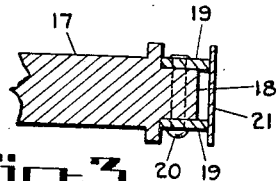
Fig. 3 is a sectional view taken on line 3—3 of Fig. 2.

Referring now by characters of reference to the drawing, numeral 10 indicates a frame or bracket portion of the scale mechanism which supports a self-aligning bearing unit 11 secured to the bracket 10 by screws 12, the bearing unit including a bearing steel 13 provided with a longitudinal groove in which is seated a knife-edge pivot 14 mounted in one end of a pendulum arm 15. Below and on a line with the knife-edge pivot 14 a suitable pendulum ball or counterbalance weight 16 is adjustably suspended from the pendulum arm 15.

The opposite end of the pendulum arm 15 is formed into a sector 17, the construction of which forms the basis of this invention. The sector 17 adjacent its outer marginal surface 18 is recessed to form shoulders for the accommodation of strips 19 of non-corrosive metal held to the sides of the sector 17 by rivets 20. The edges of the strips 19 are adapted to extend beyond the surface 18 of the sector 17 and form relatively narrow tracks for engagement with a flexible tape 21, one end of which is secured by a suitable connecting device 22 to one end of the sector 17, the other end being connected to weight-indicating mechanism. The conventional indicating mechanism illustrated herein includes a pair of aligning bars 23, one mounted on each side of the tape 21, and pivotally connected by means of clevis 24 and pin 25 to a block 26 from which depends a toothed rack 27, the teeth of which are adapted to engage a pinion 28 fixedly mounted on an indicator shaft 29 to one end of which is connected a dial pointer, not shown.

Figure 4:
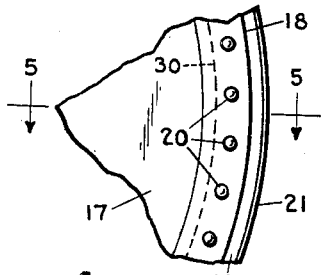
Figs. 4 and 5 are corresponding front and sectional views of a modification of the construction shown in Figs. 2 and 3.
Figure 5:
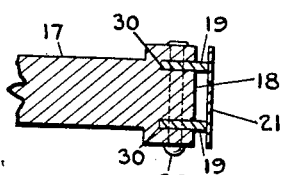

A modification of the method of mounting the strips or track elements 19 on the sector 17 is shown by Figs. 4 and 5, whereby the surface 18 of the sector 17 is provided with a pair of longitudinal grooves 30 in which are inserted the strips 19, and thereafter secured by rivets 20.

By both methods of construction a two-point contact is established between the sector 17 and tape 21 by means of strips 19, and since the edges of strips 19 provide such a small surface for dust or other foreign material to gather, this source of scale inaccuracy is practically eliminated.

Having described my invention, what I claim and desire to secure by Letters Patent is:

In a device of the character described, in combination, a weighing scale pendulum having a sector arm projecting therefrom, said sector arm having an arcuate end surface and parallel grooves formed therein, a pair of curved strips disposed in said grooves, means fixedly securing said strips in place in said grooves, said strips projecting edge-wise from the end surface of said sector arm for engagement with a pendulum tape near opposite side edges thereof.

HAROLD P. HOLT.